2,878,392
METHOD OF DETECTING LEAKS AND TESTING MEDIA THEREFOR

Anthony J. Polito, Pittsfield, Mass., assignor to General Electric Company, a corporation of New York No Drawing. Application December 7, 1954
Serial No. 473,760

12 Claims. (Cl. 250—71)

The present invention relates to the detection of leaks in metallic parts. More particularly, the invention relates to the testing for leaks in metallic vessels such as transformer casings with the use of novel leak detecting media.

Various types of examination procedures have been used heretofore to detect leaks, cracks and other flaws in metallic parts, including X-ray, microscopic, and magnetic methods, but such methods are generally expensive and do not lend themselves to rapid examination of large parts. The problem of expeditious yet reliable leak detection in large metallic, especially ferrous, vessels and casings such as transformer tanks has proved particularly troublesome, and inexpensive methods of accurately and rapidly locating leaks in such tanks have been long sought in this field.

Heretofore, it has been the practice to use mineral oils and petroleum solvents as leak testing media for transformer tanks which are subsequently to be filled with insulating liquids such as mineral oils or askarels. The principal disadvantage of such leak detecting liquids is their flammability, which makes it necessary to completely drain the testing liquid from the tank before welding repairs can be made, and requires removal of the tank from the vicinity of such inflammable liquids.

Other leak testing media which have been previously used have not been found satisfactory, either because they did not afford the necessary protection against rust to the tank tested, or they left a residue therein which contaminated the insulating liquid with which the tank was subsequently filled. Thus, while corrosion inhibitors are available which will provide the necessary protection against rust, most of such substances known at present, especially those of inorganic type, cannot be used for testing leaks in transformer casings since the residues of such materials would be harmful electrically or chemically to the insulating liquids used in the transformer. In the case of askarels of the chlorinated aromatic compound type, such as chlorinated diphenyls, the electrical insulating properties of these liquids are subject to degradation in the use of known corrosion inhibitors, while the mineral oils are subject to chemical changes forming sludge and acid.

It is, therefore, an object of the present invention to provide a method of testing for leaks in metallic parts which overcomes the above disadvantages.

A further object of the present invention is the provision of a method of testing for leaks in metallic vessels, such as transformer tanks, which allows rapid repair of the vessel to be made, e. g. by welding, without danger of fire or explosion.

Another object of the invention is the provision of a leak testing medium which is non-flammable, non-corrosive, which inhibits rust formation, and does not contaminate insulating liquids conventionally used in transformer casings. Moreover, the residue left after evaporation of the water has no adverse effects on paint adhesion nor does it affect subsequent welding operations.

It is still another object of the invention to provide a leak testing medium of the above type which is highly penetrative and which may be easily detected by visual or other means after penetration through flaw apertures in the apparatus tested.

In accordance with the invention, an effective leak detecting liquid has been found which avoids the difficulties mentioned above, the liquid being composed of an aqueous solution containing a liquid amine in suitable concentration which gives adequate protection against rust and corrosion of metal parts without contaminating insulating liquids, and a wetting agent which affords the necessary penetrating property to the leak testing solution. In addition, it is of advantage in accordance with the invention to incorporate in the above aqueous solution an indicating agent soluble in water which enables the presence of even a minute amount of the testing solution which has passed through a leak to be readily detected by suitable means.

Of the amines found suitable for use, the hydroxy alkyl amines including ethanolamine, diethanolamine, and triethanolamine have proved particularly satisfactory for use as corrosion and rust inhibitors in the present leak testing solutions. Mixtures of the above compounds may also be used, as well as other hydroxy alkyl amines such as propanolamine. It is desirable in general to select amines having a sufficiently low vapor pressure to avoid excessive volatilization of the inhibitor during storage. It is best if the inhibitor selected forms a solution with water which has a constant boiling point. The invention is not limited to aliphatic amines such as the above, since other types of amines such as the heterocyclic amine morpholine (diethylene imide oxide) have been found suitable for the purposes of the invention.

The amount of the amine in the present solution preferably ranges between 0.25–2% by weight. Larger concentrations than this are not desirable due to the possibility of adversely affecting the optimum electrical properties of the insulating liquid to be used in the tank, while smaller amounts would not afford effective rust-prevention.

In order to provide the necessary penetrating property of the present leak testing solution so that the solution will easily seep out of even the most minute apertures in the apparatus being tested, a wetting agent is incorporated in the testing solution. The wetting agent may be any of the known types of surface-active substances, including those in the anionic, cationic and non-ionic categories, which in small concentrations markedly lower the surface tension of the aqueous solution. For best results, the wetting agent used should be compatible with the particular amine employed as the corrosion inhibitor, i. e., the two compounds should be such that they will not react to change the properties of each. The amount of wetting agent used in the solution in accordance with the invention is preferably between 0.001 to 0.5% by weight.

Examples of suitable anionic wetting agents are sodium dioctyl sulfosuccinate, sodium heptadecyl sulfate, sodium dioctyl phosphate, sodium tetradecyl sulfate and alkyl aryl sodium sulfonates. Cationic wetting agents which are suitable include the polyethoxy amines. Examples of appropriate non-ionic wetting agents are di-tertiary acetylenic glycols, polyoxethylene thioethers, polyethylene glycol tert-dodecylthioether and alkyl phenyl polyethylene glycol ethers.

Since the non-ionic wetting agents do not ionize in solution, they are quite stable and more apt to be innocuous electrically and chemically to transformer insulating liquids than either anionic or cationic materials, and are therefore to be preferred over the latter types of wetting agents.

A non-ionic wetting agent which has been found particularly suitable for use in accordance with the present invention is polyethylene glycol tert-dodecylthioether.

Another type of compound having the following structure and which in the above range of concentration is an effective non-ionic wetting agent may be even more desirable due to its non-foaming properties:

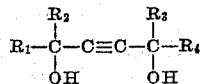

where $R_1$, $R_2$, $R_3$ and $R_4$ are aliphatic groups.

The indicating substance used in the present test solution is preferably of the type which emits radiation capable of being detected visually or by other means and includes substances which are luminescent, fluorescent or radioactive. While a wide variety of such materials may be found useful, particular examples of fluorescent materials found suitable for the present testing solution are fluorescein and beta-methyl umbelliferone. The concentration of the indicating agent is preferably in the range of 1-50 parts per million. Any water soluble radioactive material which has a suitably long life period may be used as the indicating agent instead of the above fluorescent materials. It is possible, if so desired, to use radioactive ethanolamines for this purpose, in which case the above composition would incorporate a radioactive ethanolamine as a combined corrosion inhibitor and indicating agent so as to dispense with a special indicator substance. Such a compound is available and is known as ethanolamine $C_{14}$.

The fluorescent material used may be detected visually by exposure of the escaping test liquid to a source of ultra-violet light, while the radioactive material can be detected with the use of any of a number of conventional radiation detection instruments, such as Geiger counters and visually indicating devices of this type actuated by radioactive materials.

A further variation in the manner of detecting leakage of the test solution which has been found practical consists in dusting the suspected leakage points with a fine absorbent dust impregnated with a suitable indicator capable of changing color when it comes into contact with the alkaline amine solution. For example, fine Fuller's earth having phenolphthalein incorporated therein could be used for this purpose, but it will be evident that any indicator which reacts to changes in pH by changing color would be suitable.

A specific formulation of the present leak testing solution which has been found suitable consists of water to which is added 0.5% by weight of monoethanolamine, 0.05% by weight of polyethylene glycol tert-dodecylthioether, and 50 parts per million of fluorescein.

An example of the present process of leak detection which may be carried out using the novel testing solutions described is as follows. A transformer tank or other vessel having a cover fluid-tightly sealing the interior of the tank is first completely filled with the testing solution, and a moderate amount of pressure (about 3–20 pounds) is applied to the contained solution. In order to keep foaming of the solution to a minimum, it is good practice to deliver the testing solution to the bottom of the tank to be tested via a conduit from the storage tank. The pressure desired may be afforded by continuing to run at a suitable speed the pump which delivers the solution to the tank to be tested. Higher pressures than those mentioned above may be used if desired, and pressures below that range may be applied where even the lower pressures of the range cannot be tolerated for some reason, as for example due to the thin gauge of the material of the vessel being tested.

The solutions described above are efficient for leak detection even in static testing where substantially no pressure is applied, due to the wetting effect of the surface-active substance which enables the solution to seep out of even extremely fine cracks and holes in the metallic vessel or part being tested.

In the case of the larger leaks, the amount of testing solution seeping out to the outer surface of the tank may be sufficient to be visible to the operator, who then suitably marks the locations of such leaks on the exterior of the tank.

When the leak testing solution includes a fluorescent or other luminescent material, the contrast which may be produced between the solution which has seeped out and the neighboring wall portion is sufficiently distinct for even the most minute leaks to be detected by this means. To this end, the operator exposes the outer wall surface to ultra-violet light, the inspection preferably being carried out in a darkened or semi-darkened area. In this manner, a vivid contrast is produced between the luminescent spots where the testing solution has leaked out and the dark non-fluorescent neighboring wall portions, and the observer is thereby able to accurately mark the locations of the leaks. Where a radioactive substance is present in the testing solution, similarly accurate location of leaks is made possible with the use, in this case, of appropriate radiation detecting devices now commercially available which would give audible or visual indication of any of the radioactive testing solution which has seeped out to the exterior surface of the tank.

The location of the leaks having thus been accurately and quickly determined, the welding repairs at these points may be immediately undertaken, without the necessity of draining the testing solution from the tank. In fact, the welding operations could be commenced on leaks already discovered even before the detecting and marking procedure has been completed. Since the leak testing solution is non-flammable, no danger arises from fire in carrying on such operations, and the work can thus be considerably expedited as compared to previous testing procedures where complete draining of the inflammable testing solution was necessary before any welding could be done. A further advantage of leaving the solution in the vessel during the welding operations is that after the necessary repairs are made, the repaired areas may be immediately tested again to insure that a complete seal has been made at the previously detected leak.

After the leak detection procedure is carried out, the testing solution is completely drained and the tested container is further processed as required without the necessity for removal of the residue of the testing solution. Any water remaining, however, should be removed by suitable means. In the case of a transformer casing which is to contain insulating liquids, and to which the present invention is particularly applicable, such further processing may include a painting and baking cycle, which removes any remaining water, and thereafter the insulating liquids may be placed in the tank. Cleaning of the tank interior after the leak test is not necessary since the testing solution residue not only does not contaminate the liquid or degrade the electrical properties thereof, as thorough tests have demonstrated, but also constitutes a corrosion and rust inhibitor to further protect the insulating liquid from adverse effects due to these conditions during the service of the apparatus. Moreover, the residue left after evaporation of the water has no adverse effects on paint adhesion nor on the subsequent welding operations.

While the composition disclosed has been described principally with respect to its use as a leak testing liquid for transformer casings, it will be apparent that the liquid described may have uses other than as a leak testing medium. It may find use for other applications where a non-flammable corrosion and rust inhibiting liquid having a penetrating or wetting effect is desirable. Further, it may contain other types of corrosion-inhibiting amines, wetting agents or indicating agents than those specified herein without going beyond the inventive concept. It will be understood, therefore, that modifications both in the method and composition described may be made by those skilled in the art without actually departing from the scope of the invention. Accordingly, the appended claims are intended to cover all such equivalent variations as come within the true spirit and scope of the invention.

What I claim as new and desire to secure by Letters Patent of the United States is:

1. A corrosion and rust inhibiting non-flammable leak testing liquid comprising an aqueous solution of a liquid amine selected from the group consisting of hydroxy alkyl amines and morpholine, a wetting agent, and a water soluble indicator substance for indicating the presence of said solution.

2. A corrosion and rust inhibiting non-flammable leak testing liquid comprising an aqueous solution of a hydroxy alkyl amine, a non-ionizing wetting agent, and a fluorescent indicating substance.

3. A corrosion and rust inhibiting non-flammable leak testing liquid comprising an aqueous solution of an hydroxy alkyl amine, a non-ionizing wetting agent, and a water soluble radioactive indicating substance.

4. A corrosion and rust inhibiting non-flammable leak testing liquid comprising an aqueous solution of a radioactive hydroxy alkyl amine, and a non-ionizing wetting agent.

5. A corrosion and rust inhibiting non-flammable leak testing liquid comprising an aqueous solution of approximately .25–2% by weight of monoethanolamine, 0.001–0.5% by weight of polyethylene glycol tert-dodecylthioether, and 1–50 parts per million of a fluorescent material soluble in water.

6. The method of detecting flaw apertures in a metallic body comprising treating a surface of the metallic body with a corrosion and rust inhibiting non-flammable testing liquid comprising an aqueous solution of a liquid amine selected from the group consisting of hydroxy alkylamines and morpholine and a wetting agent, so that the aqueous solution penetrates the metallic body through the flaw apertures to the opposite surface of the body; and detecting the liquid which has thus penetrated to said opposite surface for determining the location of said apertures in said metallic body.

7. The method of detecting leaks in a metallic vessel comprising filling the vessel with a corrosion and rust inhibiting non-flammable testing liquid comprising an aqueous solution of a liquid amine selected from the group consisting of hydroxy alkylamines and morpholine and a wetting agent, so that the aqueous solution penetrates the metallic vessel through the leaks therein to the exterior surface of the vessel; and detecting the liquid which has thus penetrated to the exterior surface for determining the location of the leaks in said metallic vessel.

8. The method as defined in claim 7, wherein a finely divided absorbent material impregnated with an indicator substance is applied to the exterior surface of the metallic vessel for detecting leakage of the testing liquid, the indicator substance being capable of changing appearance upon contact with the testing liquid.

9. The method of detecting leaks in a metallic vessel comprising filling the vessel with a corrosion and rust inhibiting non-flammable testing liquid comprising an aqueous solution of a liquid amine selected from the group consisting of hydroxy alkyl amines and morpholine, a non-ionizing wetting agent and fluorescent indicator substance, so that the aqueous solution penetrates the metallic vessel through the leaks therein to the exterior surface of the vessel; and exposing to ultra-violet light the fluorescent indicator substance thus penetrating to the outer surface of the metallic vessel so as to cause said substance to fluoresce, whereby the testing liquid which has thus penetrated to the exterior surface may be observed for detecting the location of the leaks in said metallic vessel.

10. The method of detecting leaks in a metallic vessel which comprises filling the vessel with a corrosion and rust inhibiting non-flammable testing liquid comprising an aqueous solution of a liquid amine selected from the group consisting of hydroxy alkyl amines and morpholine, a non-ionizing wetting agent and a radioactive indicator substance, so that the aqueous solution penetrates the metallic vessel through the leaks therein to the exterior surface thereof; and detecting the location of the liquid thus penetrating to the exterior surface of said metallic vessel by means actuated by the radioactive indicator substance in said liquid at the exterior surface whereby the location of leaks in said metallic vessel may be determined.

11. The method of detecting leaks in a metallic container for electrical apparatus while avoiding contamination of electrical insulating liquids to be used in said container, which method comprises filling the metallic container with a corrosion and rust inhibiting non-flammable testing liquid comprising an aqueous solution of an hydroxy alkyl amine selected from the group consisting of monoethanolamine, diethanolamine, and triethanolamine, and a non-ionizing wetting agent; and applying pressure to the liquid in said metallic container, so that the liquid penetrates the metallic container through the leaks therein to the exterior surface of the container, whereby the liquid which has thus penetrated to the exterior surface may be detected for determining the location of the leaks in said metallic container.

12. The method of detecting leaks in a metallic container for electrical apparatus while avoiding contamination of electrical insulating liquids to be used in said container, which method comprises filling the metallic container with a corrosion and rust inhibiting non-flammable testing liquid comprising an aqueous solution of not more than 2% by weight of monoethanolamine, non-ionizing wetting agent comprising polyethylene glycol tert-dodecylthioether, and an indicator substance; applying pressure to the liquid in said metallic container, so that the liquid penetrates the metallic container through the leaks therein to the exterior surface of the container; and detecting the liquid which has thus penetrated to the exterior surface by means coacting with the indicator substance in said penetrating liquid for determining the location of the leaks in said metallic container.

References Cited in the file of this patent

UNITED STATES PATENTS

| | | |
|---|---|---|
| 1,903,287 | Cox | Apr. 4, 1933 |
| 1,988,584 | Dana et al. | Jan. 22, 1935 |
| 2,205,021 | Schuette et al. | June 18, 1940 |
| 2,346,043 | Mysels | Apr. 4, 1944 |
| 2,434,448 | Wade | Jan. 13, 1948 |
| 2,635,329 | De Forest et al. | Apr. 21, 1953 |

OTHER REFERENCES

"Triton N. E.," Pamphlet of Rohm and Haas Co., Philadelphia, Pennsylvania (1943), pages 3 and 13.